US008545912B2

(12) United States Patent  
Crouse et al.

(10) Patent No.: US 8,545,912 B2
(45) Date of Patent: Oct. 1, 2013

(54) POTASSIUM FORTIFICATION IN BEVERAGES AND METHODS THEREOF

(75) Inventors: Christine M. Crouse, Cary, IL (US); Kristin Parshall, Algonquin, IL (US); Nicholas Shields, Carpentersville, IL (US); J. Michael Smith, Chicago, IL (US)

(73) Assignee: Tropicana Products, Inc., Bradenton, FL (US)

( * ) Notice: Subject to any disclaimer, the term of this patent is extended or adjusted under 35 U.S.C. 154(b) by 0 days.

(21) Appl. No.: 12/015,351

(22) Filed: Jan. 16, 2008

(65) Prior Publication Data

US 2009/0181129 A1    Jul. 16, 2009

(51) Int. Cl.
*A23L 1/30* (2006.01)

(52) U.S. Cl.
USPC ............. 426/74; 426/72; 426/599; 426/648

(58) Field of Classification Search
USPC ........................................................ 426/74
See application file for complete search history.

(56) References Cited

U.S. PATENT DOCUMENTS

| | | | |
|---|---|---|---|
| 4,038,421 A | 7/1977 | Mendy et al. | |
| 4,250,264 A * | 2/1981 | Nelson et al. | 435/253.6 |
| 5,310,570 A | 5/1994 | Kwapong et al. | |
| 5,348,756 A | 9/1994 | Lee et al. | |
| 5,409,692 A | 4/1995 | Nakahara et al. | |
| 5,532,022 A | 7/1996 | Miller et al. | |
| 6,261,613 B1 | 7/2001 | Narayanaswamy et al. | |
| 6,440,482 B1 | 8/2002 | Henson et al. | |
| 6,565,898 B2 | 5/2003 | McArdle et al. | |
| 6,673,380 B2 | 1/2004 | Yang et al. | |
| 2002/0058087 A1 | 5/2002 | Henson et al. | |
| 2003/0211204 A1 | 11/2003 | Fields et al. | |
| 2004/0022921 A1 | 2/2004 | Lee et al. | |
| 2004/0047950 A1 | 3/2004 | Gambino et al. | |
| 2004/0161496 A1 | 8/2004 | Bouman et al. | |
| 2005/0232908 A1 | 10/2005 | Kim et al. | |
| 2006/0068074 A1 | 3/2006 | Stefandl | |
| 2006/0204632 A1 | 9/2006 | Barrett-Reis et al. | |
| 2007/0003672 A1 | 1/2007 | Anglea et al. | |
| 2008/0254168 A1 | 10/2008 | Mueller et al. | |
| 2009/0169685 A1 * | 7/2009 | Spelman et al. | 426/74 |

FOREIGN PATENT DOCUMENTS

| | | |
|---|---|---|
| AU | 2008243239 A1 | 7/2009 |
| CA | 2644392 A1 | 6/2009 |
| EP | 2080437 A1 | 7/2009 |
| EP | 2237685 A2 | 10/2010 |
| GB | 1204055 | 9/1970 |
| JP | 2007006888 A | 1/2007 |

OTHER PUBLICATIONS

International Search Report and Written Opinion relating to corresponding PCT/US2009/030321.
Examination Report relating to corresponding AU Application No. 20092005621.
Rejection Notice relating to corresponding JP Application No. 2010-541596, issued Feb. 28, 2012.
English Translation of Rejection Notice relating to corresponding JP Application No. 2010-541596, issued Feb. 28, 2012.
English Abstract of JP 2007006888.
Office Action relating to corresponding CN Application No. 200980102242.9, issued Apr. 28, 2012.
English Translation of Office Action relating to corresponding CN Application No. 200980102242.9, issued Apr. 28, 2012.
First Examiner's Report relating to corresponding CA Application No. 2,710,537, issued Mar. 26, 2012.
Office Action issued for corresponding Chinese Patent Application No. 200980102242.9, dated Nov. 13, 2012.
English Translation of Office Action issued for corresponding Chinese Patent Application No. 200980102242.9, dated Nov. 13, 2012.
Office Action issued for corresponding European Patent Application No. 09701959.0, dated Feb. 12, 2013.
Office Action relating to corresponding MX Application No. MX/a/2010/007270, issued Aug. 31, 2012.
English Translation of Office Action relating to corresponding MX Application No. MX/a/2010/007270, issued Aug. 31, 2012.

* cited by examiner

*Primary Examiner* — Elizabeth Gwartney
(74) *Attorney, Agent, or Firm* — Banner & Witcoff, Ltd.

(57) ABSTRACT

A potassium-fortified beverage comprising a first potassium component and a second potassium component, the first potassium component comprising monopotassium phosphate, and the second potassium component selected from the group consisting of dipotassium phosphate and potassium citrate and any combinations thereof. The potassium-fortified beverage can be made using a potassium-fortifying composition comprising a blend of the first potassium component and the second potassium component. Methods for making the potassium-fortified beverage and the potassium-fortifying composition are also provided.

38 Claims, No Drawings

POTASSIUM FORTIFICATION IN BEVERAGES AND METHODS THEREOF

FIELD OF THE INVENTION

The present invention relates generally to beverages and compositions and methods for making beverages. More particularly the present invention relates to fortifying beverages, such as juice beverages, with potassium.

BACKGROUND

It is well known in the art to add minerals and vitamins to beverages in order to fortify beverages with healthy or desired vitamins and minerals. One problem associated with this, particularly with respect to the mineral potassium, is that once the mineral is added, the acidity will tend to change to an undesirable degree. In particular, adding potassium citrate causes the pH to rise of a beverage. To maintain the pH of the potassium fortified beverage at a desirable pH, an acid, for example, either citric or malic acid is typically added to the beverage.

It is known that as a beverage becomes fortified, the pH of the beverage will rise, and therefore the beverage becomes more basic. To counter this, an acidulent is typically added to the beverage in order to keep the pH of the beverage lower. The acidulent is added in order to bring the pH of the beverage down and counter the effects of fortification. This is desired because as the beverage is more acidic, it becomes more resistant to microbial growth. As an example, a typical juice is desired to have a pH of around 4.3, where it will exhibit a reduction in the rate of growth of spoilage microorganisms

BRIEF SUMMARY OF THE INVENTION

In accordance with a first aspect, a potassium-fortifying composition comprises a blend of a first potassium component and a second potassium component, the first potassium component comprising monopotassium phosphate, and the second potassium component selected from the group consisting of dipotassium phosphate and potassium citrate and any combinations thereof. In addition, it is contemplated that the second component may be added prior to adding the first component and also that both components may be added at the same time.

In accordance with a second aspect, a method for fortifying beverages is provided. The method comprises the steps of predetermining an amount of a first potassium component and an amount of a second potassium component to be blended together, and blending the predetermined amounts of the first potassium component and the second potassium component, the first potassium component comprising monopotassium phosphate, and the second potassium component selected from the group consisting of dipotassium phosphate and potassium citrate and any combinations thereof.

In accordance with a third aspect, a potassium-fortified beverage comprises a first potassium component and a second potassium component, the first potassium component comprising monopotassium phosphate, and the second potassium component selected from the group consisting of dipotassium phosphate and potassium citrate and any combinations thereof.

In accordance with a fourth aspect, a method comprises the steps of adding to a beverage a first potassium component and adding to the beverage a second potassium component, the first potassium component comprising monopotassium phosphate, and the second potassium component selected from the group consisting of dipotassium phosphate and potassium citrate and any combinations thereof.

It will be appreciated by those skilled in the art, given the benefit of the following description of certain exemplary embodiments of the beverage and other beverage products disclosed here, that at least certain embodiments of the invention have improved or alternative formulations suitable to provide desirable pH profiles, taste profiles, nutritional characteristics, etc. These and other aspects, features and advantages of the invention or of certain embodiments of the invention will be further understood by those skilled in the art from the following description of exemplary embodiments.

DETAILED DESCRIPTION

Those of ordinary skill in the art will understand that, for convenience, some components or ingredients are described here in certain cases by reference to the original form of the component or ingredient in which it is added to the blend or beverage product formulation. Such original form may differ from the form in which the ingredient is found in the finished blend or beverage product. Thus, for example, in certain exemplary embodiments of the potassium-fortified blend or beverage products according to this disclosure, potassium would typically be substantially homogenously dissolved and dispersed in the blend or beverage. Likewise, other ingredients identified as a solid, concentrate (e.g., juice concentrate), etc. would typically be homogenously dispersed throughout the blend or beverage or throughout the beverage concentrate, rather than remaining in their original form. Thus, reference to the form of a component or ingredient of a blend or beverage product formulation should not be taken as a limitation on the form of the component in the ingredient in the beverage product, but rather as a convenient means of describing the ingredient as an isolated component of the blend or product formulation.

It should be understood that blends, beverages and other beverage products in accordance with this disclosure may have any of numerous different specific formulations or constitutions. The formulation of a beverage product in accordance with this disclosure can vary to a certain extent, depending upon such factors as the product's intended market segment, its desired nutritional characteristics, flavor profile and the like. For example, it will generally be an option to add further ingredients to the formulation of a particular beverage embodiment, including any of the beverage formulations described below. For example, additional (i.e., more and/or other) vitamins and minerals can be added, as well as sweeteners, flavorings, electrolytes, vitamins, fruit juices or other fruit products, tastents, masking agents and the like, flavor enhancers, and/or carbonation typically can be added to any such formulations to vary the taste, mouthfeel, nutritional characteristics, etc.

In general, a beverage in accordance with this disclosure typically comprises a juice. Additional and alternative suitable ingredients will be recognized by those skilled in the art given the benefit of this disclosure.

A method for fortifying a beverage is provided. The method includes creating a blend or composition with a first component that includes monopotassium phosphate and a second component that includes a second potassium source. The second component comprises a potassium compound selected from the group consisting of dipotassium phosphate and potassium citrate, and any combinations thereof. In one embodiment, the resultant blend or composition is added to a beverage to form a fortified beverage. In one embodiment, the blend or composition is mixed with the beverage to form a homogeneous fortified beverage. Advantageously, the fortified beverage has a stable pH. The fortified beverage can be homogenized and/or pasteurized as would be appreciated by those skilled in the art. In a further embodiment, the beverage is a juice beverage, including but not limited to citrus beverages, such as orange, lemon, lime and grapefruit, tangerine, mandarin orange, tangelo, pomelo, pomegranate and guava beverages, and non-citrus beverages such as apple, grape, cherry, banana and pineapple beverages and the like, and mixtures thereof, including mixtures of both citrus and non-citrus beverages.

A potassium fortified beverage composition is provided. More particularly a potassium fortified beverage that maintains a stable pH when the potassium source is added is provided. It is contemplated that compositions in accordance with the present invention can be in particulate or liquid form, either of which can be added to a beverage where fortification is desired.

Exemplary fruit beverages that can be fortified with the flavors include the citrus flavors, e.g., orange, lemon, lime and grapefruit, tangerine, mandarin orange, tangelo, pomelo, pomegranate and guava, and non-citrus flavors such as apple, grape, cherry, and pineapple flavors and the like, and mixtures thereof, including mixtures of citrus and non-citrus flavors.

Potassium sources for use in the invention include monopotassium phosphate and either dipotassium phosphate or potassium citrate. In one embodiment of the invention, a blend of potassium sources including monopotassium phosphate and either dipotassium phosphate or potassium citrate is utilized in order to maintain the pH during potassium fortification. In certain embodiments, the blend of potassium sources includes a first component and a second component. The first component includes monopotassium phosphate. The second component includes dipotassium phosphate, potassium citrate and combinations thereof. It is contemplated that other sources of potassium may also be used. For example, potassium gluconate may be used as a potassium source. These blends in potassium sources lead an acidulent not being necessary to be added into the juice in order to maintain a desired pH. In addition to the potassium sources, it is contemplated that other components may be included in the compositions. For example, many beverages also include other vitamin and mineral fortifications, such as B vitamins, Vitamins A, C (ascorbic acid), or E. In addition, it is contemplated that other components such as calcium or other items such as fiber will be included in compositions for use with beverages in order to fortify the beverages. It is contemplated that the blends of potassium sources will not increase the pH of the solution as the potassium sources are added to the solution. Thus, as the blends of potassium sources are added to the solution, the pH of the solution remains about the same or is lowered to become more acidic.

In one embodiment, a weight ratio of the first component (i.e., monopotassium phosphate) to the second component (i.e., dipotassium phosphate, or potassium citrate and any combinations thereof) is about 95:5.

In one embodiment, a weight ratio of the first component (i.e., monopotassium phosphate) to the second component (i.e., dipotassium phosphate, or potassium citrate and any combinations thereof) is about 75:25.

In one embodiment, a weight ratio of the first component (i.e., monopotassium phosphate) to the second component (i.e., dipotassium phosphate, or potassium citrate and any combinations thereof) is about 50:50. It is contemplated that the above ratios maybe modified and/or optimized depending on the application and/or preferences as would be appreciated by those of ordinary skill in the art.

A desired amount of the potassium source is provided to the beverage. The amount may vary depending on the application and nutritional content desired. In one embodiment, the beverage comprises about 5-5000 mg of functional ingredient per 8 fluid ounces (0.24 liters) (serving size). The amount to be added will vary to suit a particular application and can be based, at least in part, on nutritional value, taste, shelf-life, efficacy levels approved, qualified health claims and combinations thereof. Other amounts are also contemplated within the scope of the invention as would be appreciated by those of ordinary skill in the art. For example, it may be desired to provide at least 1 mg of potassium, including, in particular 700 mg per serving of the food product to meet the United States Food and Drug Administration (FDA) 'excellent' source nutrient content claim requirements, or less milligrams in order to meet the FDA 'good' source nutrient content claim requirements.

Orange juice typically has a recommended daily value ("RDV") of potassium of about 13%. According to the RDV standards, a good source of potassium is about 10%, and 20% is considered an excellent source of potassium. RDV is a reference point for consumers to be able to make judgments on the overall health value of a food item and their diet and is set forth by the Food and Drug Administration ("FDA"). Embodiments of the invention allow for a higher percentage of potassium in a beverage without the negative effect of a higher pH and the need to lower the elevated pH with an acid. For example, the amount of potassium may be increased in a juice beverage using the disclosed blend and/or methods disclosed herein from about 13% RDV to a range of about 20-26% RDV, without the need to add an additional amount of acid to maintain the desired pH level. It is contemplated that beverages in accordance with the invention can have any RDV value by adding potassium and depending on the desired amount of potassium and depending on the particular application. By reducing or eliminating the need to add a separate acidulent, production of the juice beverage can be more efficient and production time reduced, and the length of the ingredient statement can be reduced as well.

By mixing the two components to form the composition, the composition can be added to a beverage, such as orange juice, which will become fortified upon mixing. Moreover, the pH of the beverage will remain stable on adding the composition thereto, thus disposing of any need to add an acid component to bring the pH down. Preferably, the pH of the beverage is maintained at a level that is less than about 4.3.

The potassium compositions disclosed above can be added to the beverage using any suitable technique. In one embodiment, high shear mixing can be performed on the beverage; however, other types of mixing are also contemplated as would be appreciated by those of ordinary skill in the art, including but not limited to, low energy/low shear mixing (e.g., stirring) and high energy/high shear mixing. The mixing can be performed manually or as part of a batch process. In another embodiment, the potassium compositions are added using a continuous process, i.e., where the potassium sources are fed in at a constant rate. In still other embodiments, a slurry of concentrated potassium products can be created and then fed into the finished product. Still other methods of adding the potassium compositions are contemplated as would be appreciated by those of ordinary skill in the art.

In the following examples, all juice formulas assume about 450 mg of potassium per 8 ounce serving inherent in juice, for example, orange juice. It is contemplated that the juice can be any type of juice, including orange, strawberry, banana, apple, etc. A basis of 3500 mg of potassium was used for 100% of the recommended daily value.

EXAMPLE 1

A percent composition of orange juice was provided. The orange juice accounted for 20% DV of potassium and utilized a 50/50 blend of dipotassium phosphate and monopotassium phosphate. The composition included:

TABLE 1

| | % wt |
|---|---|
| Orange Juice | 99.75 |
| Dipotassium Phosphate | 0.094 |
| Monopotassium Phosphate | 0.158 |

The composition yielded a pH of about 4.2 and exhibited other favorable characteristics, such as flavor and mouthfeel consistent with orange juice, lack of off notes, etc.

EXAMPLE 2

A percent composition of orange juice was provided. The orange juice accounted for 26% DV of potassium and utilized a 50/50 blend of dipotassium phosphate and monopotassium phosphate. The composition included:

TABLE 2

| | % wt |
|---|---|
| Orange Juice | 99.53 |
| Dipotassium Phosphate | 0.182 |
| Monopotassium Phosphate | 0.286 |

The composition yielded a pH of about 4.3 and exhibited other favorable characteristics, such as flavor and mouthfeel consistent with orange juice, lack of off notes, etc.

EXAMPLE 3

A percent composition of orange juice was provided. The orange juice accounted for 20% DV of potassium and utilized a 25/75 blend of dipotassium phosphate and monopotassium phosphate. The composition included:

TABLE 3

| | % wt |
|---|---|
| Orange Juice | 99.72 |
| Dipotassium Phosphate | 0.047 |
| Monopotassium Phosphate | 0.237 |

The composition yielded a pH of about 4.2 and exhibited other favorable characteristics, such as flavor and mouthfeel consistent with orange juice, lack of off notes, etc.

EXAMPLE 4

A percent composition of orange juice was provided. The orange juice accounted for 26% DV of potassium and utilized a 25/75 blend of dipotassium phosphate and monopotassium phosphate. The composition included:

TABLE 4

| | % wt |
|---|---|
| Orange Juice | 99.48 |
| Dipotassium Phosphate | 0.091 |
| Monopotassium Phosphate | 0.429 |

The composition yielded a pH of about 3.9 and exhibited other favorable characteristics, such as flavor and mouthfeel consistent with orange juice, lack of off notes, etc.

EXAMPLE 5

A percent composition of a 100% juice beverage (from concentrate) was provided. The juice beverage accounted for 20% DV (8% inherent) of potassium and utilized a 50/50 blend of dipotassium phosphate and monopotassium phosphate. The composition included:

TABLE 5

| | % wt |
|---|---|
| Filtered Water | 77.590 |
| Dipotassium Phosphate | 0.1259 |
| Monopotassium Phosphate | 0.5945 |
| Banana Puree Concentrate | 6.375 |
| Strawberry Puree Concentrate | 1.833 |
| Apple Juice Concentrate | 13.482 |

The composition yielded a pH of about 4.2 and exhibited other favorable characteristics, such as flavor and mouthfeel consistent with a 100% fruit juice drink with banana and strawberry, etc.

EXAMPLE 6

A percent composition of a 100% juice beverage (from concentrate) was provided. The juice beverage accounted for 10% DV (4% inherent) of potassium and utilized a 75/25 blend of dipotassium phosphate and monopotassium phosphate. The composition included:

TABLE 6

| | % wt |
|---|---|
| Filtered Water | 78.126 |
| Dipotassium Phosphate | 0.032 |
| Monopotassium Phosphate | 0.149 |
| Banana Puree Concentrate | 6.391 |
| Strawberry Puree Concentrate | 1.831 |
| Apple Juice Concentrate | 13.471 |

The composition yielded a pH of about 3.9 and exhibited other favorable characteristics, such as flavor and mouthfeel consistent with 100% fruit juice etc.

The foregoing embodiments are to be considered in all respects illustrative rather than limiting the invention described herein. The invention has been described with reference to certain preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

Given the benefit of the above disclosure and description of exemplary embodiments, it will be apparent to those skilled in the art that numerous alternative and different embodiments are possible in keeping with the general principles of the invention disclosed here. Those skilled in this art will recognize that all such various modifications and alternative embodiments are within the true scope and spirit of the invention. The appended claims are intended to cover all such modifications and alternative embodiments. It should be understood that the use of a singular indefinite or definite article (e.g., "a," "an," "the," etc.) in this disclosure and in the following claims follows the traditional approach in patents of meaning "at least one" unless in a particular instance it is clear from context that the term is intended in that particular instance to mean specifically one and only one. Likewise, the term "comprising" is open ended, not excluding additional items, features, components, etc.

What is claimed is:

1. A potassium-fortifying composition consisting essentially of:
    a blend of a first potassium component and a second potassium component;
    the first potassium component comprising monopotassium phosphate; and
    the second potassium component selected from the group consisting of dipotassium phosphate, potassium citrate and any combinations thereof, wherein each potassium component is present in a relative amount such that the pH of an acidic beverage remains about the same or is lowered by the potassium-fortifying composition, and wherein said first component and second component are in a ratio of about 50:50 to about 95:5 by weight of elemental potassium provided by said first component relative to weight of elemental potassium provided by said second component.

2. The composition of claim 1 wherein said first component and second component are in a ratio of about 95:5 by weight of elemental potassium provided by said first component relative to weight of elemental potassium provided by said second component.

3. The composition of claim 1 wherein said first component and second component are in a ratio of 75:25 by weight of elemental potassium provided by said first component relative to weight of elemental potassium provided by said second component.

4. The composition of claim 1 wherein said first component and second component are in a ratio of 50:50 by weight of elemental potassium provided by said first component relative to weight of elemental potassium provided by said second component.

5. The composition of claim 1 wherein said composition is a particulate.

6. The composition of claim 1 wherein said composition is a liquid.

7. The potassium-fortifying composition of claim 1, wherein said first potassium component consists essentially of monopotassium phosphate, and said second potassium component consists essentially of potassium citrate.

8. The potassium-fortifying composition of claim 1 wherein the pH of the acidic beverage is lowered by the potassium-fortifying composition.

9. An acidic beverage made using the composition of claim 1.

10. The acidic beverage of claim 9 wherein said acidic beverage is a juice.

11. The acidic beverage of claim 10 wherein said juice is selected from the group consisting of orange, lemon, lime and grapefruit, tangerine, mandarin orange, tangelo, pomelo, pomegranate, guava, apple, grape, cherry, banana, pineapple juices and mixtures thereof.

12. A potassium-fortified acidic beverage comprising a first potassium component and a second potassium component, the first potassium component comprising monopotassium phosphate, and the second potassium component selected from the group consisting of dipotassium phosphate and potassium citrate and any combinations thereof, wherein each potassium component is present in a relative amount such that the pH of the acidic beverage remains about the same or is lowered by the potassium components, and wherein said first component and second component are in a ratio of about 50:50 to about 95:5 by weight of elemental potassium provided by said first component relative to weight of elemental potassium provided by said second component.

13. The composition of claim 12 wherein said first component and second component are in a ratio of about 95:5 by weight of elemental potassium provided by said first component relative to weight of elemental potassium provided by said second component.

14. The composition of claim 12 wherein said first component and second component are in a ratio of 75:25 by weight of elemental potassium provided by said first component relative to weight of elemental potassium provided by said second component.

15. The composition of claim 12 wherein said first component and second component are in a ratio of 50:50 by weight of elemental potassium provided by said first component relative to weight of elemental potassium provided by said second component.

16. The potassium-fortified acidic beverage of claim 12 wherein the pH of the acidic beverage is lowered by the potassium components.

17. A potassium-fortified acidic juice beverage comprising a first potassium component and a second potassium component, the first potassium component comprising monopotassium phosphate, and the second potassium component comprising dipotassium phosphate, wherein each potassium component is present in a relative amount such that the pH of the acidic juice beverage remains about the same or is lowered by the potassium components, and wherein said first component and second component are in a ratio of about 50:50 to about 95:5 by weight of elemental potassium provided by said first component relative to weight of elemental potassium provided by said second component.

18. The potassium-fortified acidic juice beverage of claim 17 wherein the pH of the acidic juice beverage is lowered by the potassium components.

19. A potassium-fortified beverage comprising:
    a juice and a potassium fortifying composition,
    wherein the pH of the potassium-fortified beverage is 4.3 or less, and
    wherein the potassium fortifying composition consists essentially of monopotassium phosphate and dipotassium phosphate, wherein each potassium component is present in a relative amount such that the pH of the acidic beverage remains about the same or is lowered by the potassium fortifying composition, and wherein the monopotassium phosphate and the dipotassium phosphate are present in the potassium fortifying composition in a ratio of about 50:50 to about 75:25 by weight of elemental potassium provided by monopotassium phosphate relative to elemental potassium provided by dipotassium phosphate.

20. The potassium-fortified beverage of claim 19, wherein the juice is orange juice.

21. The potassium-fortified beverage of claim 19, wherein the beverage further comprises one or any combination of a fruit puree, filtered water and added B vitamins.

22. The potassium-fortified beverage of claim 19 wherein the pH of the acidic beverage is lowered by the potassium fortifying composition.

23. A potassium-fortifying composition consisting essentially of:
 a blend of a first potassium component and a second potassium component;
 the first potassium component comprising monopotassium phosphate; and
 the second potassium component selected from the group consisting of dipotassium phosphate, potassium citrate and any combinations thereof, wherein each potassium component is present in a relative amount such that the pH of the acidic beverage remains about the same or is lowered by the potassium fortifying composition, and wherein said first component and second component are in a ratio of about 50:50 to about 75:25 by weight of elemental potassium provided by said first component relative to weight of elemental potassium provided by said second component.

24. The potassium-fortifying composition of claim 23 wherein the pH of the acidic beverage is lowered by the potassium fortifying composition.

25. A potassium-fortified acidic beverage comprising a first potassium component and a second potassium component, the first potassium component comprising monopotassium phosphate, and the second potassium component selected from the group consisting of dipotassium phosphate and potassium citrate and any combinations thereof, wherein each potassium component is present in a relative amount such that the pH of the acidic beverage remains about the same or is lowered by the potassium components, and wherein said first component and second component are in a ratio of about 50:50 to about 75:25 by weight of elemental potassium provided by said first component relative to weight of elemental potassium provided by said second component.

26. The potassium-fortified acidic beverage of claim 25 wherein the pH of the acidic beverage is lowered by the potassium components.

27. A potassium-fortified acidic juice beverage comprising a first potassium component and a second potassium component, the first potassium component comprising monopotassium phosphate, and the second potassium component comprising dipotassium phosphate, wherein each potassium component is present in a relative amount such that the pH of the acidic beverage remains about the same or is lowered by the potassium components, and wherein said first component and second component are in a ratio of about 50:50 to about 75:25 by weight of elemental potassium provided by said first component relative to weight of elemental potassium provided by said second component.

28. The potassium-fortified acidic juice beverage of claim 27 wherein the pH of the acidic beverage is lowered by the potassium components.

29. A potassium-fortified acidic orange juice beverage comprising a first potassium component and a second potassium component, the first potassium component comprising monopotassium phosphate, and the second potassium component comprising dipotassium phosphate, wherein each potassium component is present in a relative amount such that the pH of the acidic orange juice beverage remains about the same or is lowered by the potassium components, and wherein said first component and second component are in a ratio of about 50:50 to about 75:25 by weight of elemental potassium provided by said first component relative to weight of elemental potassium provided by said second component.

30. The potassium-fortified acidic orange juice beverage of claim 29 wherein the pH of the acidic orange juice beverage is lowered by the potassium components.

31. A method for fortifying an acidic beverage comprising the steps of:
 predetermining an amount of a first potassium component and an amount of a second potassium component to be blended together;
 blending the predetermined amounts of the first potassium component and the second potassium component, wherein the first potassium component comprises monopotassium phosphate, and the second potassium component is selected from the group consisting of dipotassium phosphate and potassium citrate and any combinations thereof; and
 adding said blended potassium components to an acidic beverage;
 wherein each potassium component is present in a relative amount such that upon adding said blended potassium components to the acidic beverage, the pH of the beverage remains about the same or is lowered, and wherein said first component and second component are in a ratio of about 50:50 to about 95:5 by weight of elemental potassium provided by said first component relative to weight of elemental potassium provided by said second component.

32. The method of claim 31 wherein upon adding said blended potassium components the pH of the beverage is lowered.

33. A method for fortifying an acidic beverage comprising the steps of adding to an acidic beverage a first potassium component and adding to the acidic beverage a second potassium component, the first potassium component comprising monopotassium phosphate, and the second potassium component selected from the group consisting of dipotassium phosphate and potassium citrate and any combinations thereof, wherein each potassium component is present in a relative amount such that upon adding each potassium component to the acidic beverage, the pH of the acidic beverage remains about the same or is lowered, and wherein said first component and second component are in a ratio of about 50:50 to about 95:5 by weight of elemental potassium provided by said first component relative to weight of elemental potassium provided by said second component.

34. The method of claim 33 wherein upon adding each potassium component to the acidic beverage the pH of the acidic beverage is lowered.

35. A method for fortifying an acidic beverage comprising the steps of:
 predetermining an amount of a first potassium component and an amount of a second potassium component to be blended together;
 blending the predetermined amounts of the first potassium component and the second potassium component, wherein the first potassium component comprises monopotassium phosphate, and the second potassium component is selected from the group consisting of dipotassium phosphate and potassium citrate and any combinations thereof; and
 adding said blended potassium components to an acidic beverage;
 wherein each potassium component is present in a relative amount such that the pH of the acidic beverage remains about the same or is lowered by the potassium components, and wherein said first component and second component are in a ratio of about 50:50 to about 75:25 by weight of elemental potassium provided by said first component relative to weight of elemental potassium provided by said second component.

36. The method of claim 35 wherein the pH of the acidic beverage is lowered by the potassium components.

37. A method for fortifying an acidic beverage comprising the steps of adding to an acidic beverage a first potassium component and adding to the acidic beverage a second potassium component, the first potassium component comprising monopotassium phosphate, and the second potassium component selected from the group consisting of dipotassium phosphate and potassium citrate and any combinations thereof, wherein each potassium component is present in a relative amount such that the pH of the acidic beverage remains about the same or is lowered by the potassium components, and wherein said first component and second component are in a ratio of about 50:50 to about 75:25 by weight of elemental potassium provided by said first component relative to weight of elemental potassium provided by said second component.

38. The method of claim 37 wherein the pH of the acidic beverage is lowered by the potassium components.

* * * * *